United States Patent [19]

Shatkin

[11] Patent Number: 4,730,226

[45] Date of Patent: Mar. 8, 1988

[54] ACTUATOR CARRIAGE WITH "SPLAYED-BEARING" ARRAY

[75] Inventor: Arkady K. Shatkin, San Jose, Calif.

[73] Assignee: Unisys Corporation, Detroit, Mich.

[21] Appl. No.: 816,606

[22] Filed: Jan. 6, 1986

[51] Int. Cl.⁴ .......................... G11B 5/55; G11B 21/08
[52] U.S. Cl. ..................................... 360/106; 360/104
[58] Field of Search .................... 360/106, 109, 97–99, 360/104, 75

[56] References Cited

U.S. PATENT DOCUMENTS

| 4,393,425 | 7/1983 | Wright | 360/106 X |
| 4,414,594 | 11/1983 | Farmer et al. | 360/106 |
| 4,418,370 | 11/1983 | Harrison | 360/109 X |
| 4,427,905 | 1/1984 | Sutton | 310/13 |
| 4,462,054 | 7/1984 | Dong et al. | 360/105 X |
| 4,475,136 | 10/1984 | Manzke et al. | 360/106 |

Primary Examiner—John H. Wolff
Attorney, Agent, or Firm—John J. McCormack; Kevin R. Peterson; Edmund M. Chung

[57] ABSTRACT

Disclosed are reciprocating carriages carried on roll bearings engaged on guide rails, where some of the bearings are made flexible to be compliantly engaged against a rail surface.

21 Claims, 15 Drawing Figures

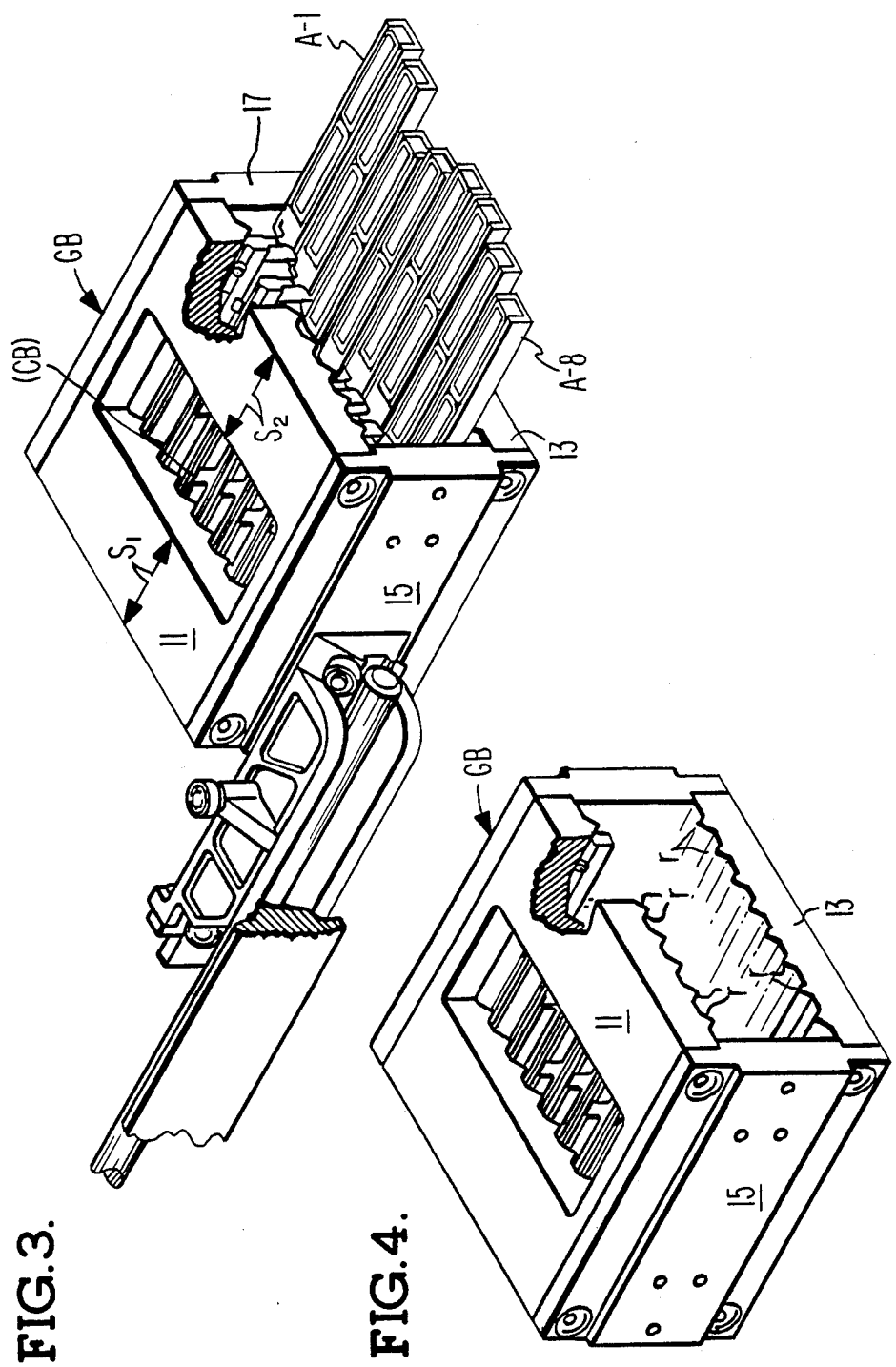

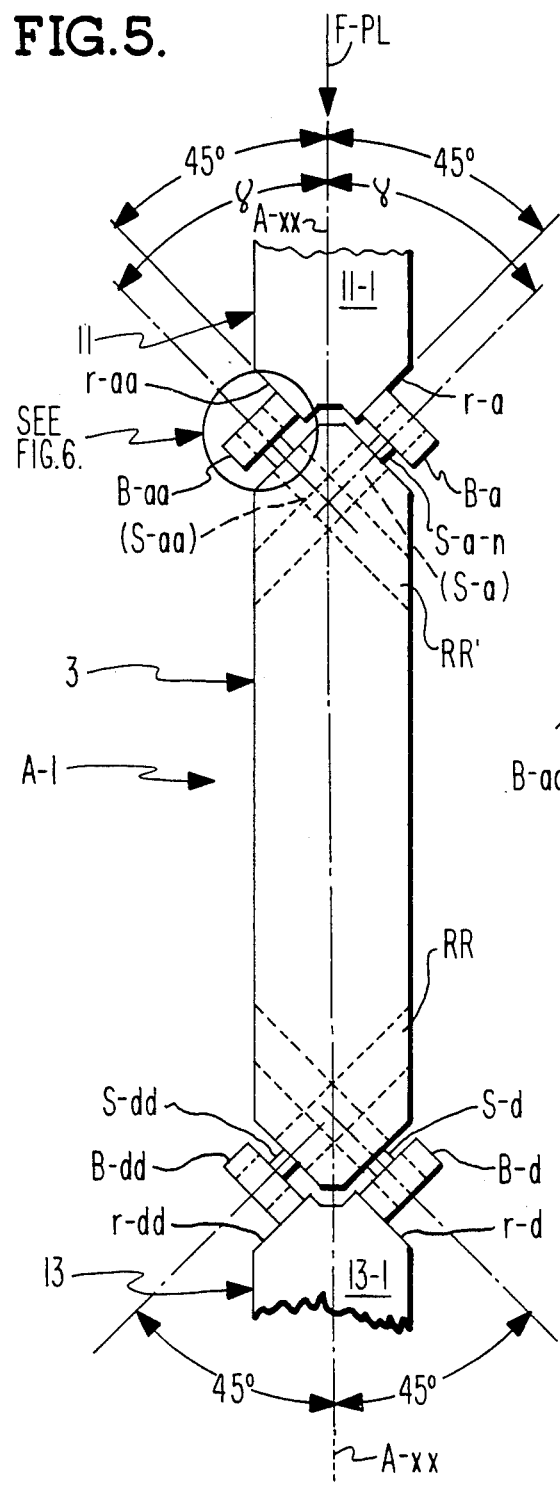
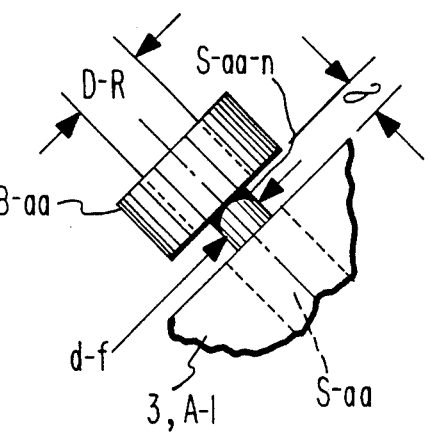
FIG. 5.
FIG. 6.

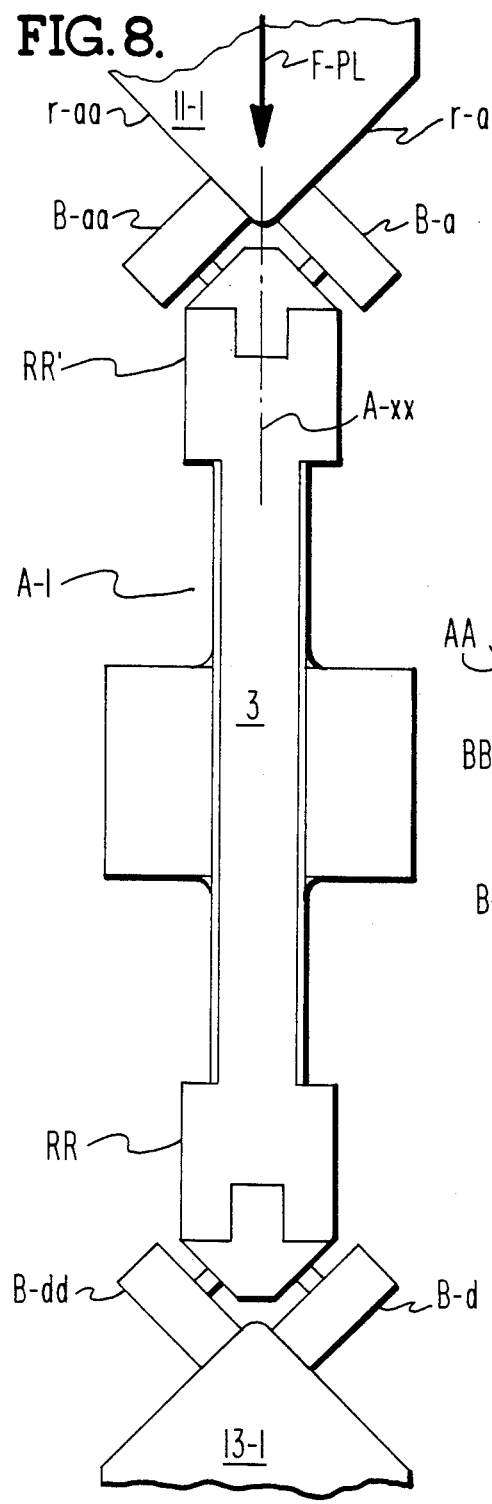
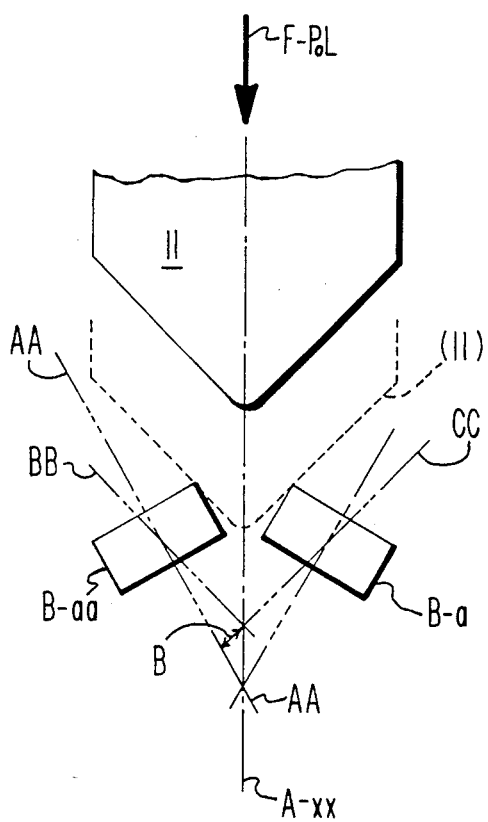

ACTUATOR CARRIAGE WITH "SPLAYED-BEARING" ARRAY

BACKGROUND, FEATURES OF INVENTION

This invention relates to novel actuator carriage means.

Magnetic disk files for recording and storing data are widely used in data processing; e.g., as peripheral memory. Disk files have the advantage of facilitating data transfer at randomly selected address locations (tracks), yet rapidly.

The transducers used in association with disk recording surfaces must be reciprocated very rapidly between selected address locations (tracks) with high precision. It will be recognized as important for such a system to move a transducer very rapidly between data locations; and to do so with high positional accuracy between closely-spaced track addresses. This constraint becomes very tricky as track density increases. Typically, such disk storage systems mount the transducer head on an arm carried by a block that is supported by a carriage. This carriage is usually mounted on track ways for reciprocation by an associated transducer actuator. This disclosure relates to improving such carriages.

The present trend is toward ever higher track density with increased storage capacity and decreased access time. Of course, as track density rises, closer control over the actuator mechanism is necessary to position transducer heads accurately over any selected track; also the carriage and other actuator parts must be made yet simpler and lighter to accommodate such fast accurate positioning. This disclosure concerns improved means of mounting a carriage on its track ways.

Known positioners:

Such transducer actuators (linear positioners) employed with magnetic disk memory systems are subject to stringent requirements; for instance, these systems typically involve a stack of several magnetic disks, each with many hundreds of concentric recording tracks spanning a radius of 4–12 inches; and a head-carrying arm is typically provided to access each pair of opposing disk surfaces. This arm will typically carry two to four heads so that it need be moved only about 2–3 inches (radially) to position its head adjacent any selected track. Thus, it will be appreciated that such applications involve extreme positioning accuracy together with very high translation speeds (to minimize access time—a significant portion of which is used for head positioning). Such a positioner must move its transducer heads very rapidly so that the associated computer can process data as fast as possible—computer time being so expensive that any significant delay over an extended period (of even a fraction of a millisecond) can raise costs enormously ("transition time", during which heads are moved from track to track, is "dead time" insofar as data processing is concerned, of course).

Thus, computer manufacturers typically set specifications that require such inter-track movements to take no more than a few milliseconds. Such high speed translation imposes extreme design requirements; it postulates a powerful motor of relatively low mass (including carriage weight) and low translational friction.

Another requirement for such head positioners is that they exhibit a relatively long stroke, on the order of 0.5–4 inches or more, in order to minimize the number of heads required per recording surface.

The prior art discloses many such positioner devices, including some intended for use in magnetic disk memory systems: e.g., see U.S. Pat. Nos. 3,135,880; 3,314,057; 3,619,673; 3,922,720; 4,001,889; 4,150,407; 3,544,980; 3,646,536; 3,665,433; 3,666,977; 3,827,081; 4,331,990; 4,414,594 and 3,922,718 among others.

Known actuator approach (FIGS. 7A, 7B):

FIGS. 7A, 7B schematically illustrate a known sort of "flat coil" linear positioner A-m which can be considered as comprised of two primary assemblies: a mobile armature-carriage assembly A-c essentially including flat coils, head mount, roller bearing and support means; plus a fixed housing and permanent magnet structure A-g with the magnet shunts, sides, etc.

As shown in the drawings for purposes of illustration, the invention is to be understood as incorporated in a magnetic disk memory system, including a plurality of disks D in a conventional stacked array Pk, arranged in vertical spaced relation with a related stacked array of head assemblies h. Each head assembly h is mounted at the distal end of an armature carriage A-c to be reciprocated back and forth in its disk-gap relative to a respective pair of magnetic recording disk surfaces.

With selective positioning of each head assembly in a conventional manner, the "flat armature" (coil) means provided may be electrically energized to move into a retracted or extended position as known in the art (relative to associated pair of disk surfaces) and read or record information on any selected track thereof. Thus, the head assemblies h are supported in pairs on actuator strip A-m, to be projected in cantilever fashion as part of a rolling carriage supported by rollers r and movable along track rails R. The reciprocating actuator assembly A-m, carrying coil C, is operable when coil C is current-energized in a conventional manner, to move the carriage along the associated cavity, toward and away from the disk stack between a plurality of precisely located addresses, these addresses, or track positions, determine the position of heads within the stack in the known manner. The opposite (rear) end of the actuators includes their flexible connector (head cable) means, and associated connections, these being provided conventionally and as known in the art.

As detailed in FIG. 7, each actuator strip A-m includes two double roller assemblies r on each side thereof (or two such opposed by a single third roller as an option). These dual-opposed wheels are adapted, as known in the art, to engage a respective guide rail R as indicated in FIG. 7B in rolling contact when the assembly A-m is translated along its elongate axis (in moving head assembly h relative to track addresses on a respective pair of disks D as well known in the art). Each actuator strip A-m is adapted to be so-reciprocated along a respective actuator cavity between opposed sets of permanent magnet poles m.

FIG. 7 also illustrates details of such a flat coil actuator strip A-c where, according to various further features, the strip is formed into a relatively thin, lightweight, planar body and is adapted to receive flat coil winds (preferably as a printed circuit board PCB, with two or more flat, overlapped coils C printed thereon). Electronic circuit means e is also preferably mounted on each strip A-c at the designer's option (e.g., read/write electronics for the associated actuator).

Such a "flat armature" A-m will be understood to comprise a "planar trolley" carrying read/write heads h at its distal end and mounted on bearings to be reciprocated freely along a track between upper and lower relatively flat opposing pole pairs.

The instant teaching illustrates ways to improve such actuator carriages (e.g., FIGS. 7A, 7B), especially in making (some) roller means thereof "flexible" and better able to engage related rail means.

In accordance with one salient aspect of the present invention, such a transducer positioner is formed to comprise a thin flat "planar" carriage. In one embodiment, the carriage is comprised o a thin, planar frame carrying wire loops as driving coils.

It will be readily apparent to workers how such a "planar carriage" can provide the moving coil structure for an improved linear actuator, compressing it and flattening it out, as well as facilitating a great reduction in mass and volume. Such an improved armature will be seen to give superior performance.

According to a feature hereof such planar carriages are provided, one for each disk gap, in integral relation with a direct-access disk drive apparatus. In such an apparatus the linear positioning operates responsive to electrical signals to its coils causing it to carry heads between disk track addresses. Such a "planar carriage" positioner will be understood and described below as comprising a movable, planar non-magnetic frame on which coils are disposed, this frame being adapted to be reciprocated along the "magnet gap" between an array of stationary permanent magnet means responsive to certain current through the coil windings.

Thus, an electrical address signal to the coils may be directly converted into linear actuator motion providing high speed head translation. Such an "armature" will be seen to eliminate much unnecessary mass and reduce associated power and actuator volume (e.g., the wound coil may be potted and form an extension of the carriage frame for carrying a set of recording heads and eliminates all intermediate means and their associated mass and complications.

In a related feature, it will be seen that such planar carriage means include roll bearings (as wheels riding on associated track-ways) which are improved to be better engaged with their guide means (track-ways) to afford positive track-engagement and retention, full-line contact (alignment), etc. This disclosure is intended to teach such implementation.

Workers are aware that mounting such actuator "trucks" (carriages) for rapid, low-friction precise reciprocation is a particular challenge—especially where reliability and precise positioning must be maintained over millions of high-acceleration cycles, yet while minimizing cost of fabrication. And, with such a truck mounted on a roller (or like wheel means) to recrprocate along track means, it is a particular challenge to get the roller precisely engaged on the track means (cf. "full-line-contact"), and hold it there, despite violent acceleration.

Of course, one could make or buy "perfectly aligned" roll means and track means, and could individually match them to one another—but this is quite expensive and not well-suited to mass-fabrication or the use of off-the-shelf components. Also, one would still want to bias the roll means against the rail means (or vice versa).

Such problems are alleviated, according to this teaching, by making some roll means flexible—particularly where roller means are so mounted on their rotation-shaft as to "bend" or be compliantly shifted by bias-engagement with their rail means so as to assume better, full-line contact therewith.

Thus, one object of this invention is to provide the mentioned and other features and advantages. Another object is to teach the use of such "planar carriage actuators" in transducer assemblies, especially as adapted for positioning heads in a disk drive. A related object is to adapt the actuator carriage means to better engage associated guideways.

A further object is to provide multi-arm disk drive positioners which are "modular", one for each disk gap.

Another object is to "miniaturize" head actuators for disk drives; a related object is to reduce their cost, weight and power consumption, while improving acceleration.

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIGS. 5 and 8 are fragmentary end sections of one of the actuator strips from FIG. 2, one "flexible bendable" roller thereof being shown in FIG. 6.

FIG. 7A schematically shows a prior art actuator strip somewhat like that of FIG. 2, while

FIG. 9 is an idealized schematic showing of a pair of flexible, bendable roller means, such being similarly shown in FIG. 10 (reduced shaft-diameter)

FIG. 1 schematically illustrates a magnetic disk drive arrangement of a type used in high speed digital data processing and apt for use with the present invention, this embodiment and all others mentioned herein being understood as constructed and operating as presently known in the art and implemented (materials, methods, devices, apparatus, etc.) by known expedients according to present good practice, except where otherwise specified.

Figure 1:
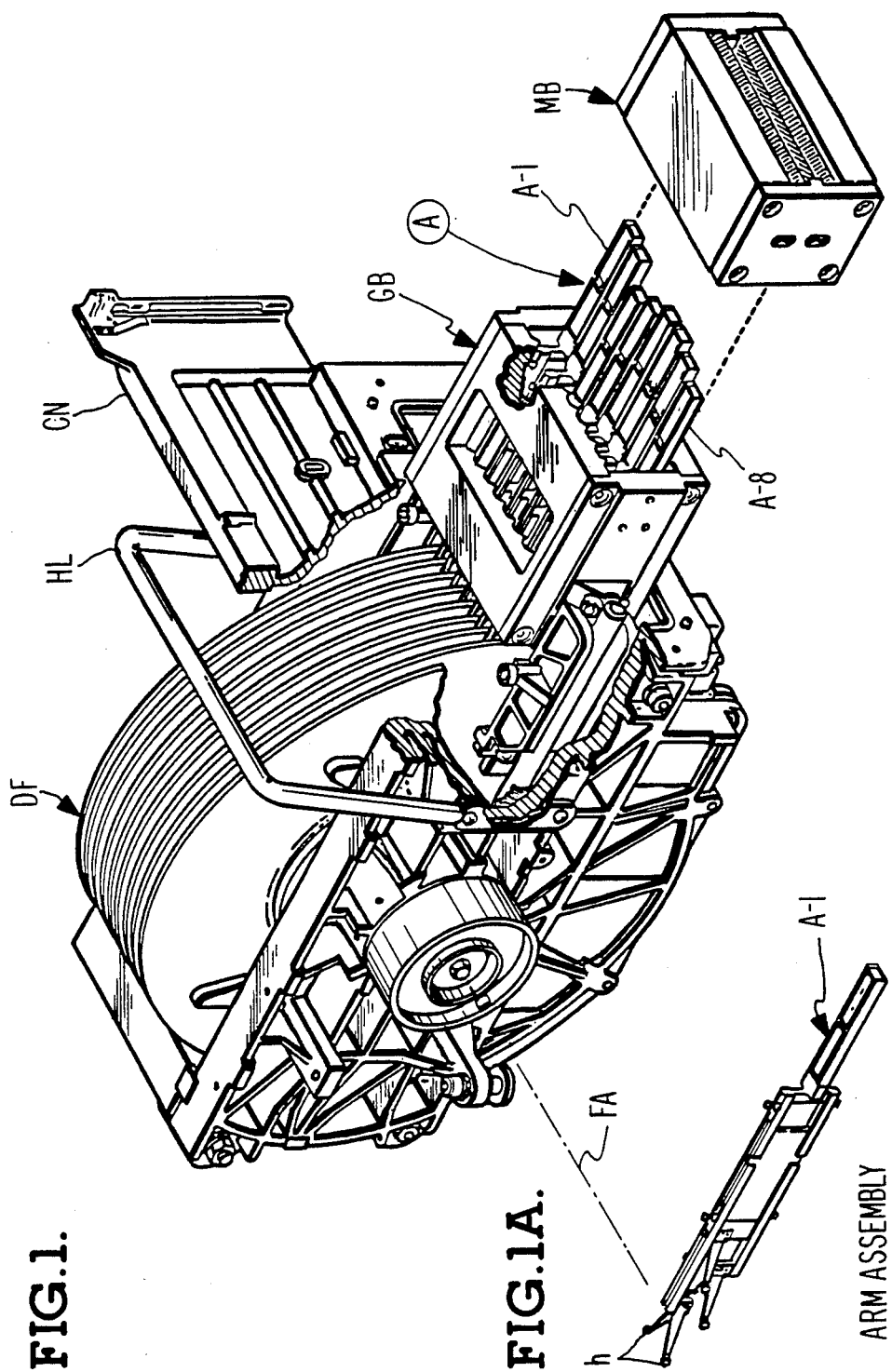
FIG. 1 is a perspective schematic partial view of an improved disk drive embodiment with several actuator module embodiments, one shown in partly-disassembled perspective view in FIG. 1A and in enlarged view in FIG. 2, with the drive-segments of the carriage array in FIG. 1 shown in FIG. 3 in enlarged perspective, disposed in a guide box; and with FIG. 4 showing this guide box.

Among other things, workers will recognize that FIG. 1 shows a known sort of disk file DF embodied in a removable HDA unit (e.g., handle HL being provided for ready removal from the disk drive and mounting plate CN provided for adjacent location of chips and other miniature electronic parts as known in the art).

In association with one preferred embodiment wherein actuator carriage means are arranged and disposed to be "self securing" on at least some of their associated guideways, an array of "flat strip" actuators A is disposed so each may present an array of magnetic transducer heads h (see FIG. 1A; heads h each projected from the distal end of a respective carriage via a flexure spring as known in the art). Each carriage is driven to thrust its heads into an associated interdisk gap for recording and readout with respect to the disk surfaces, each actuator strip being individually operable. The actuator strip A is electromagnetically driveable by proper operative association with portions of magnet block MB according to special features hereof, and is mounted in prescribed disposition and alignment in an associated "guide box" GB (both guide box and magnetic block described in more detail below). Such an array is particularly apt for advantageous use with an embodiment of the present invention described below (e.g., see FIGS. 2–10).

As workers know, the reciprocation stroke for such actuator strips will be a fixed distance ($R_s$). Now a feature of guide box GB is that its upper preloading guide plate 11 (FIG. 3) will be apertured to allow passage of electrical connector means (see CB) to each actuator (e.g., for coil-current, head signals, etc.). Thus, plate 11 must present portions on either side of this opening which are long enough (rails there-along) to accommodate this stroke distance $R_s$. Thus, lengths $S_1$, $S_2$ along this direction on plate 11 will be so dimensioned that the associated underlying roll means (B-b/B-bb for $S_1$; B-a/B-aa for $S_2$) will have adequate rail length to move on (cf. thus $R_s < S_1$; $R_s < S_2$).

According to this arrangement, a prescribed number of the individual, independently-operable actuator strips A is arrayed "vertically" along the direction (axis FA) of stacking of the disks in file DF, or parallel to their axis of rotation. One actuator strip A is provided for each interdisk gap (nine disks shown here, with eight such gaps, one actuator A for each understood, all actuator strips being essentially identical in structure and operation).

Figure 2:
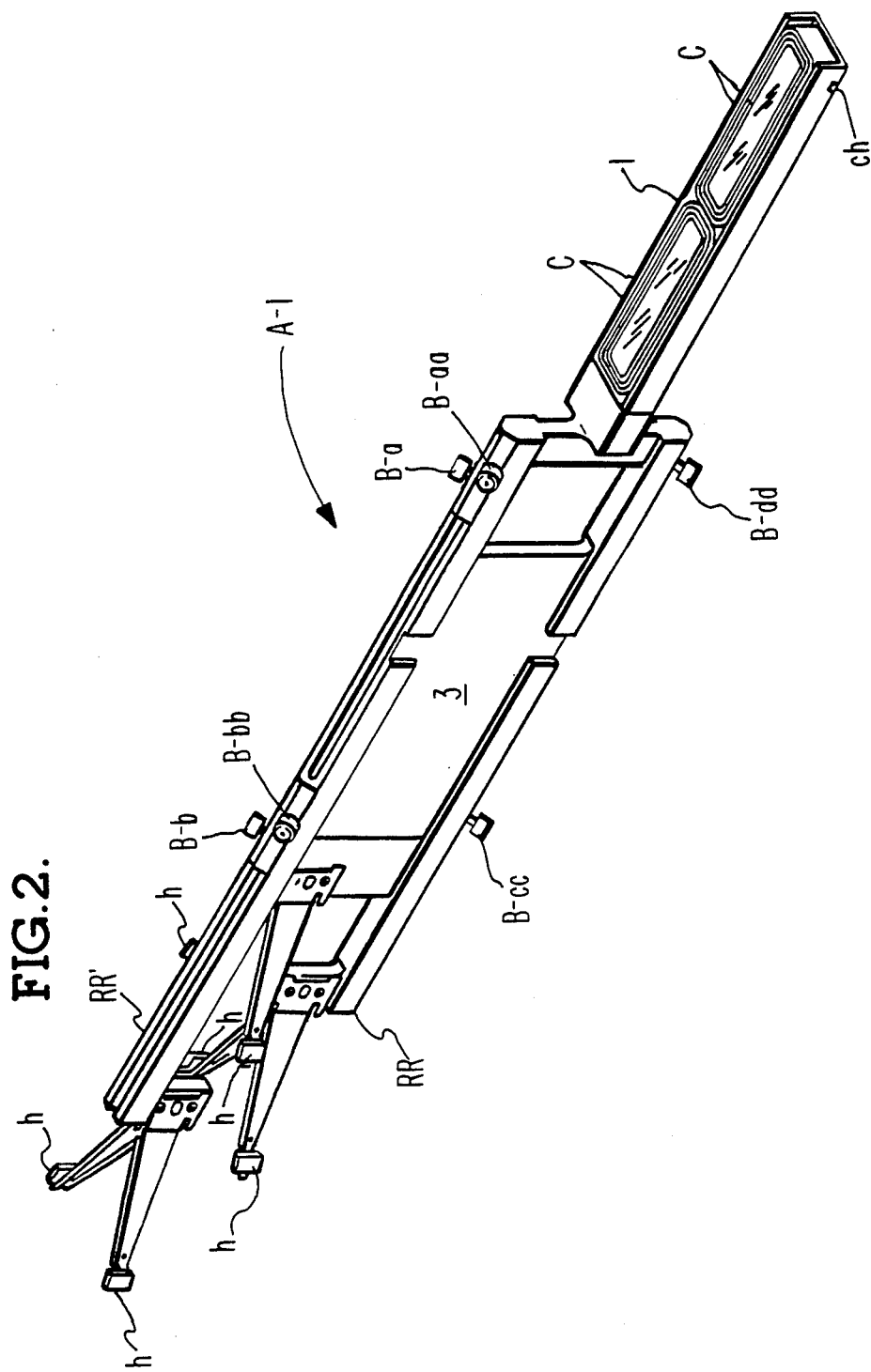
Figure 7A:
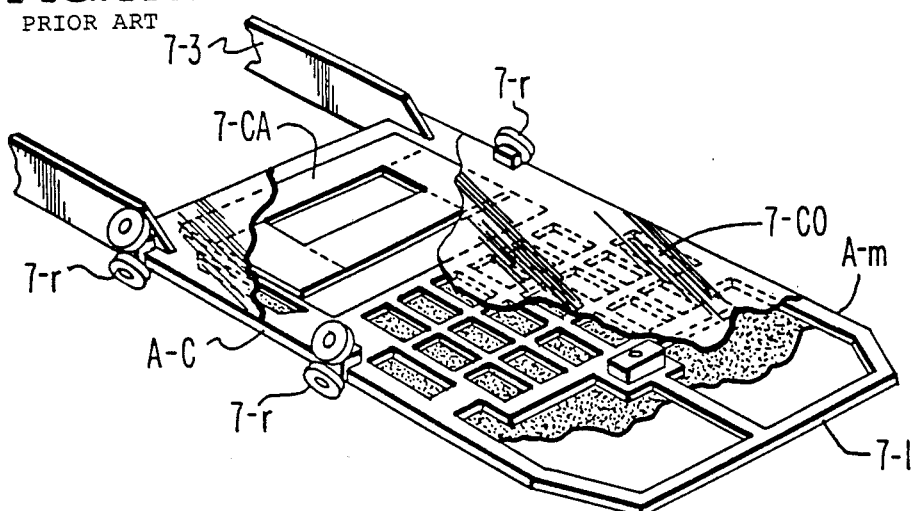
Figure 7B:
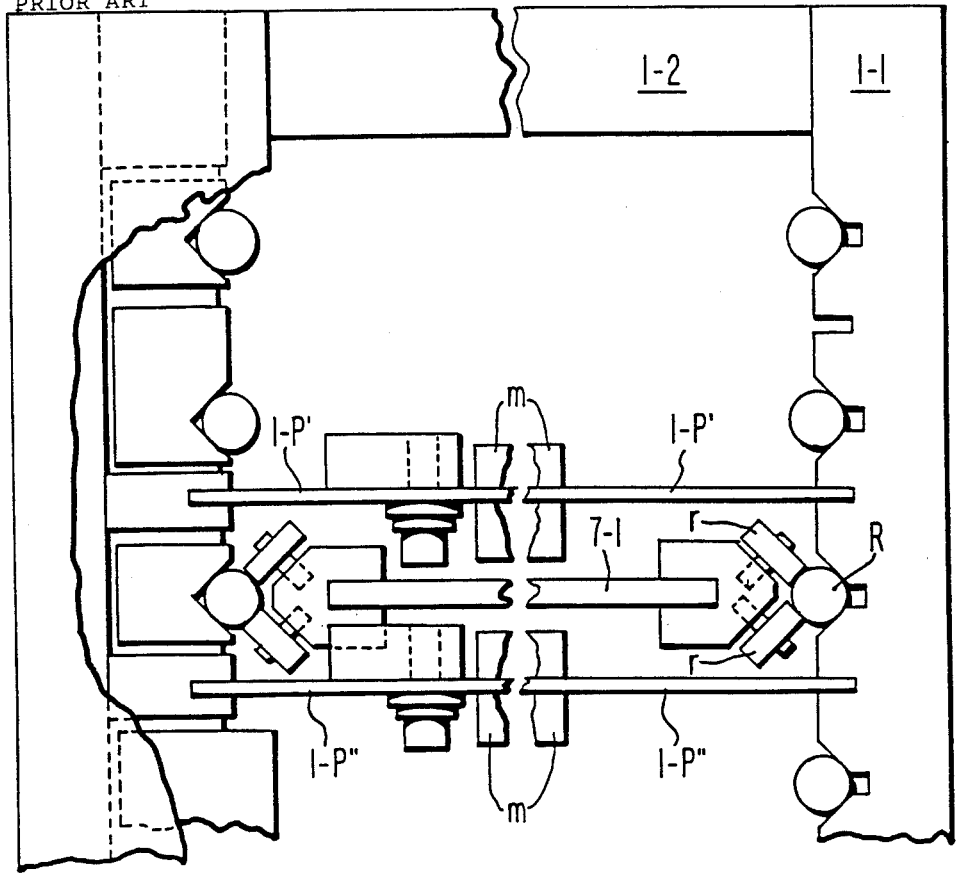
FIG. 7B shows such in end-view as mounted between associated guide rail means.

An exemplary actuator strip A-1 is shown in FIG. 1A and in enlarged perspective view in FIG. 2 and will be seen as, in general, comprising a thin, flat base section 3 (e.g., magnesium or other light, strong, non-magnetic material such as aluminum) flanked by a pair of lateral roller assemblies RR, RR', one on each side. Strip A-1 is adapted to present a plurality of magnetic recording transducers h projected and mounted in appropriate known fashion from base means 3. Each lateral roller assembly RR, RR' comprises two pairs of like roller means B, preferably a "miniature ball bearing" like those sold by N.M.B. Co. (also called "rollers" here, and comprising a cylindrical barrel mounted for rotation on a shaft via balls) or a like roller means as known in the art. For instance, assembly RR' comprises a "left" pair of roller bearings B-b, B-a, together with an associated offset pair of "right" bearings B-bb, B-aa, each "left" bearing being offset by a prescribed like amount from its nearby right bearing to allow tapping of shaft-receiving holes. Opposite roller assembly RR is similarly constructed. And projected from the "near" end (heads h on the distal end) of base 3 is an electromagnetic driving strip 1 comprising coils embedded in epoxy or the like (one or several coils as seen below).

Each roll assembly with its two pairs of left and right bearings will be understood as adapted for precise rolling engagement with a respective "two track", guide or rail member (e.g., see FIG. 8, rail members 11-1, 13-1, each presenting a pair of tracks or "flats", each "flat" disposed to guidingly engage a respective bearing— e.g., bearing B-a along flat r -a). For instance, FIG. 5 shows exemplary arm A-1 with bearings B-a, B-aa engaged upon a respective rail 11-1 (flats r -a, r -aa thereof), while on the opposite side, bearings B-d, B-dd are engaged upon the associated rail 13-1 (flats r -d, r -dd). As a related subfeature, such upper and lower rail pairs 11-1, 13-1 are combined for the entire actuator array into a guide box GB, with the upper rails 11-1, 11-2, etc. integrated into an upper guide plate 11 and the lower rail pairs 13-1, 13-2, etc. into a lower guide plate 13, as shown in FIGS. 3 and 4 (FIG. 4 showing only part of the actuators).

Also, a portion of FIG. 3 is broken away giving a fragmentary view of a few bearings of A-1 and A-2 in operative engaged relation with their guide rails.

According to a principal feature of invention illustrated in the embodiment of FIGS. 6–9, for instance, one of the roll-assemblies (here RR') is made "flexible", having roll means adapted and disposed to be "splayed" or diverged, when forcibly engaged against their related rail (cf. B-a, B-aa vs. 11-1)—i.e., when thrust thereagainst with a prescribed (minimum) loading force F-PL. Force F-PL (from plate 11) will be just sufficient to spread-apart or "splay" the left and right roller bearings and so positively and precisely engage both roller surfaces in full "line contact" on both of the respective rail-flats. Workers should understand that a flexible roll assembly will have at least one in each pair of its roll means (bearing) adapted to so bend when pre-loaded; and, surprisingly, it is preferred that "not all" bearings be flexible, but that one pair have both flexible, and the other pair "only one" flexible. If all the bearings (on RR') are flexible, undesirable vibration, oscillation, "fish tail" and like twisting can result in operation, and precise, repeatable positioning be relatively impossible. Similar results accrue if no pair has both bearings made flexible.

This is indicated somewhat functionally, for instance, in FIGS. 8, 9. Here, exemplary actuator strip A-1 (shown in end view) has each roller section RR, RR' with both pairs of rollers engaged firmly and smoothly with the respective flats of the associated track-ways 13-1, 11-1. Thus, bearrngs B-a, B-aa in full line contact on respective flats r -a, r -aa of rail 11-1, and bearings B-d, B-dd likewise on flats r -d, r-dd of rail 13-1.

To functionally illustrate this feature, we show in FIG. 9, in fragmentary view and schematically, what happens (qualitatively) when the upper guide plate 11 (flats r -a, r -aa) is withdrawn and pulled out of engagement with the associated bearings (B-a, B-aa, etc.). Thus, it will be noted that this removal causes the bearings to converge toward one another into what will be understood as their natural "rest position" (at which they are out of engagement with their respective rail-flats (the condition "as-manufactured" and before captured, for instance, between guide plates 11, 13 of block GB described above).

Stated otherwise, it will be understood that (e.g., see FIG. 3), when one, or several, actuators is disposed in proper alignment within guide block GB, with bearings resting firmly on respective track faces of lower guide plate 13, the upper pre-loading guide plate 11 may then be thrust into bearing-engagement so that each pair of its rail-flats contact associated bearings and spread them apart (i.e., "splay" flexible pair, shifting from "rest" axis of rotation AA of B-aa, to "pre-loaded" axis BB; likewise shift B-a to rotate about CC). This may be characterized as a "self pre-loading" roller-rail assembly. Thus, when assembly of the guide box is completed and guide plate 11 lowered in proper alignment and secured (for instance, by screws or the like to side members 15, 17 as known in the art), each pair of rail flats will be thrust between the flexibly mounte and "splayable" sets of bearings (e.g., see FIG. 2 and assume that only (some of) the bearings of roll assembly RR' are thus made flexible, with the other roller means RR having stable and elatively rigid bearings, these with non-bendable non-flexible shafts. The so-applied force and rail configurations will spread-apart (diverge or splay) each pair of flexible bearings (i.e., the shafts thereof), until they make "full-line contact" with their respective tracks, as indicated somewhat ideally in FIGS. 5 and 8 and understood in the art (see bearings B-a, B-aa in FIGS. 8, 9).

Workers will recognize that such a flexible roll assembly (like RR') has many advantages. For instance, it introduces desirable tolerances in required part configuration, size and relative alignment and in the degree of preloading required. If a given preload force F-PL$_1$ is sufficient to exactly align bearings B-a, B-aa, one or both of bearings B-b, B-bb might require a bit more force $\Delta f$; hence, the designer can set overall preload force to F-PL$_1$+$\Delta f$ or more and be relatively sure that all bearings are in full engagement on their flats.

Now, it has been proposed before to spring-bias an entire rail against one or several roller means, but this is hardly the same as providing "splayable" roller means, especially on only one side of a carriage and as two sets of rollers, with both rollers bendable in one set and only one bendable in the other set.

making flexible:

There are various techniques for making one or both roll means (bearings) "flexible" or "splayable" in this fashion; one way, preferred here, is to make the bearing mount-shaft so thin (reduce diameter, e.g., vs shaft of relatively rigid bearing) as to accommodate this flexibility and "splay". Thus, in FIGS. 5 and 6 it will be understood that, where the normal rigidly-mounted non-flexible bearings, e.g., B-d, B-dd, are mounted on a shaft of prescribed "large diameter" D-R (see FIG. 6 especially), the "flexible" bearings, whose shaft is to bend (such as B-a, B-aa), will have (at least a portion of) their shaft reduced in diameter to a lesser diameter d-f, as workers in the art will understand. Reduced diameter d-f is selected such as to make the indicated shaft flexible enough for the desired preload of the bearings, especially in cases where conventional methods of preloading are not suitable for various reasons, such as lack of space, etc.

Figure 10:
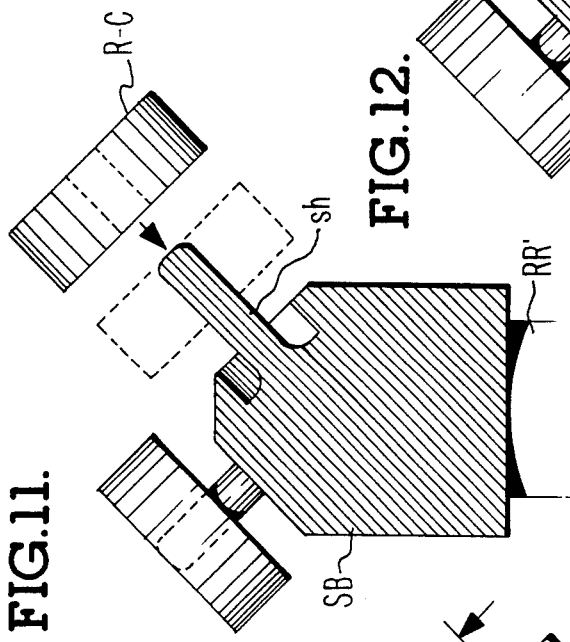

This shaft-reduction may conveniently be effected only along the mid-section as in FIG. 10 with a minimum-radius bend formed at the juncture with the large-diameter portions, avoiding sharp discontinuities in diameter (as FIG. 10 for instance). This allows one (as here) to use an off-the-shelf size roll means. In many instances, a worker may prefer to make the flexible shaft of reduced diameter d-f along its entire length (though this will sacrifice some contact-area with assembly RR' and the roll-cylinder itself).

In a mounting like that depicted here (e.g., FIG. 10), workers will appreciate that bending of the reduced-diameter bearing shaft could entail some risk of undesired contact (e.g., reduced-shaft mid section could strike seating-piece SB in FIG. 10). In such cases it will be preferable to counter bore the seating piece around the reduced-shaft section as depicted at C-0 in FIG. 10.

Thus, recapitulating FIGS. 5-9 where actuator strip A-1 has relatively rigid, non-bending bearings on one side (rigid roller assembly RR and bearings B-d, B-dd, etc., on "straight rigid shafts"), some bearings on the opposite "flexible" roller assembly RR' (e.g., bearings B-a, B-aa, B-b, B-bb, see also FIG. 2) are adapted to so bend and be "splayed" to better, more positively, more precisely engage their associated tracks and attain relatively perfect alignment thereon. The rigid bearings on roller section RR mounted on straight shafts will roll on the respective tracks of fixed lower guide plate 13, while the flexible, bendable bearings on the opposite roller section RR' will be mounted in prescribed preloaded fashion (force F-PL) with the respective tracks of their upper guide plate 11.

As indicated in FIG. 5, the preferred "operating" disposition of the bearing shafts is at 45° with respect to the actuator axis Axx—Axx (or lateral center-line), with the track surfaces (flats) of the guides 11, 13 machined at angle $\alpha$ with respect to this axis as well.

While angle $\alpha$ is preferably 45°, it might in some cases be modified about ±5° (less than 40° tends to spread the width of the actuator assembly along axis A$_{xx}$; worse, more than 50° spreads it in the 90° direction, using precious space in the direction of disk-rotation-axis F$_A$). The "rest orientation" of the flexible shaft-roll means (see $\beta$°, FIG. 9 will be set a few degrees (e.g., about 1°-3°) less than $\alpha$ (making $\beta$ about 42°-44° with respect to axis A$_{xx}$).

Thus, referring to FIG. 9 and the above explanation, it will be understood that the flexible bearings of roller means RR', such as B-a, B-aa, etc. are installed at a different angle $\beta$, less than $\alpha$ with respect to axis A-XX, and such that applied minimum preloading force F-PL to the preloading guide 11 will increase the angle of the respective bearing to "bottom" at 45° when guide plate 11 is installed and fixed in place to properly "pre-load" the bearings. This provides superior stability for the whole roller carriage system.

Of course when this technique is used (reduced diameter of flexible bearing shaft), the reduction to diameter d-f on length L as indicated in FIG. 6, for instance, the values of d-f and L will depend upon that of the preloading force F-PL.

Typical dimensions:

For better understanding of the foregoing, workers may assum the following dimensions:
actuator carriage (e.g. A-1, FIG. 2): 0.1–0.2" thick; 1–1.5" wide; and 5–6" long, excluding coil section
ball bearings (rollers): about 0.1–0.2" outside diameter, with shaft normally about 0.05" diameter (except where reduced for flexibility, e.g., to about 0.02").

Figure 11:
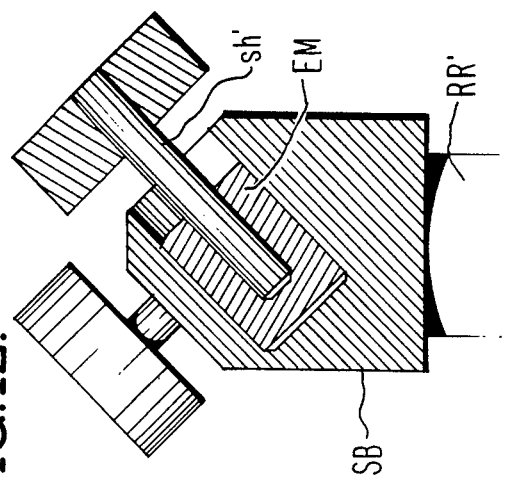
FIG. 11 (shaft integral with carriage part)

Other modifications:

In certain cases, some or all of the roller (bearing) shafts may be pre-fabricated as part of the carriage body (e.g., part of roller assembly RR, RR'). This is suggested in FIG. 11 where shaft Sh is formed integral with body RR' and adapted to receive roller cylinder R-C (including inner bearing means).

Figure 12:
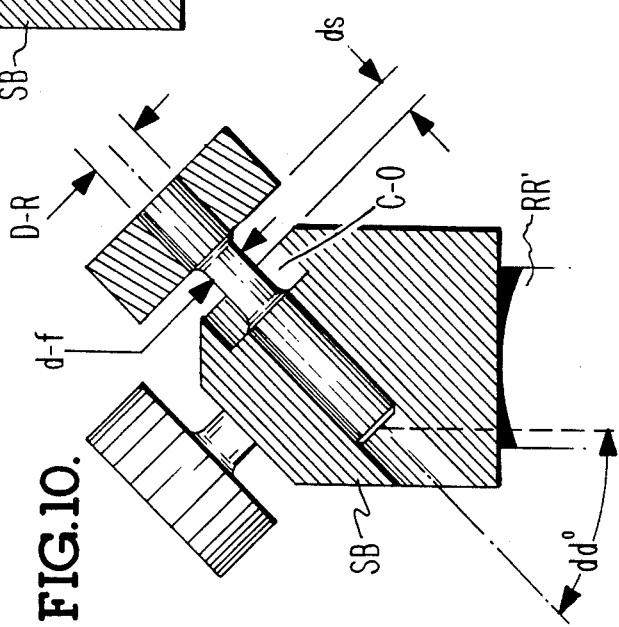
FIG. 12 (shaft mounted in elastomer insert) and FIG. 13 (rollers mounted on capstan biased toward rail).

Workers will understand, that in some instances, a variant flexibility may be imparted by mounting a "bendable" roller-shaft in a compliant mount; such is suggested in FIG. 12, where the shaft Sh' of the bendable roll means is affixed in an elastomeric insert EM lodged in a receiving cavity in carriage body RR'.

Figure 13:
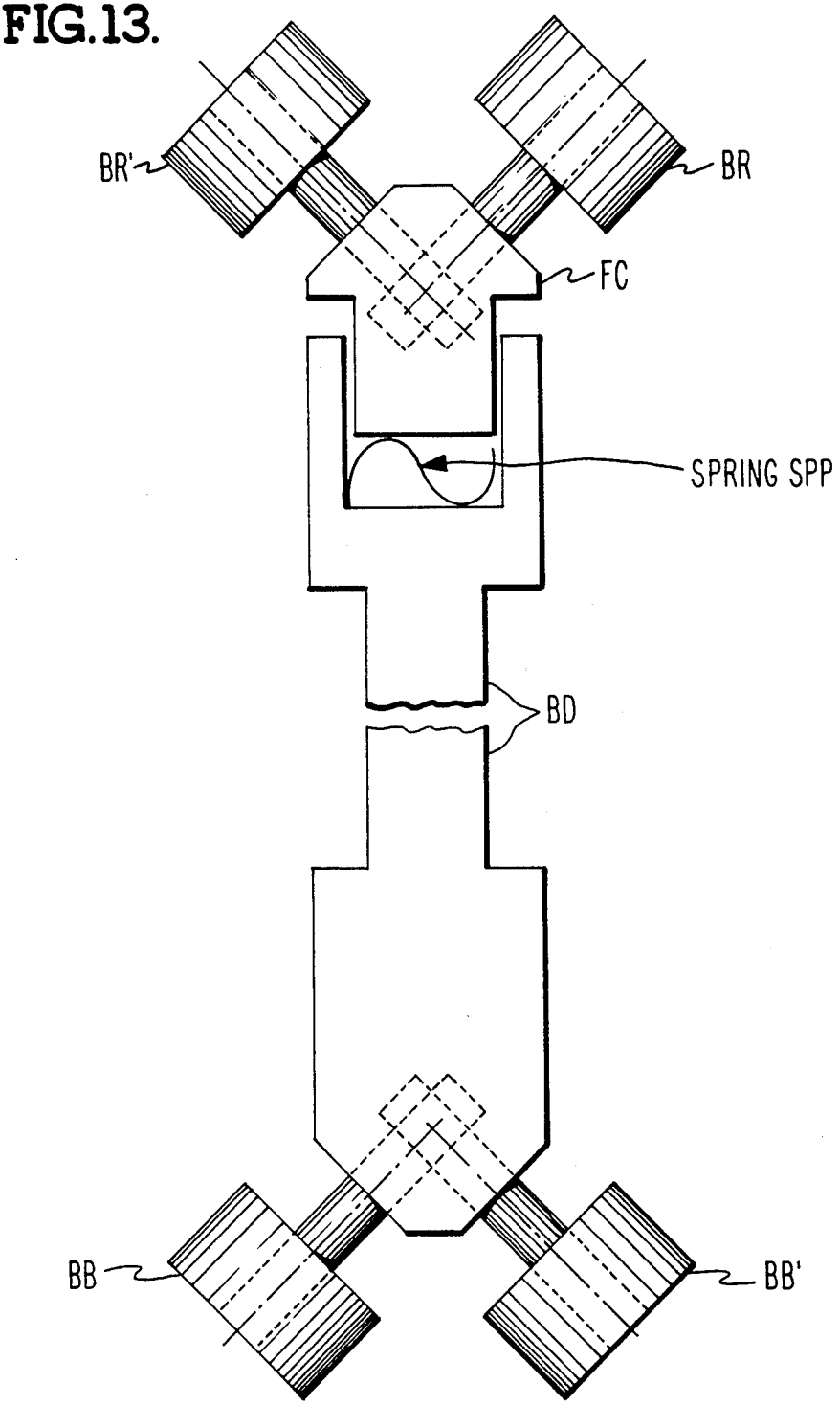

Another way of making both bearings flexible is suggested in FIG. 13, where a carriage body portion BD is adapted to mount a pair of relatively rigid bearing rollers BB, BB' on one side, and a pair of flexible rollers BR, BR' on the opposite side via a "floating" capstan FC mounted to freely reciprocate with its inner-end in a receiving cavity of body BD, being retained there (by means not indicated, but known in the art) and resiliently biased (e.g., by a flexure-plate or like spring means SPP) to urge rollers BR, BR' against their respective rail-flats. Of course, this imparts "flexibility" of a different sort to rollers BR, BR', but no "splay-ability" (—and is a useful contrast thereto). Of course, one or both of the rollers BR, BR' may also be mounted (e.g., with bendable shaft, as above) in capstan FC to also impart the previously-described "splay".

CONCLUSION

Workers will appreciate how aptly such flat armature actuator carriages are so-mounted on flexible roll means to drive transducer assemblies for disk drive apparatus and the like. In particular it will be appreciated that such actuators function to reduce the size, the weight, the power and the cost of a transducer actuator and increase its speed (acceleration) accordingly—something workers in the art are now fervently awaiting. Workers will also appreciate that such actuators may be used to reciprocate other similar loads in related environments.

It will be understood that the preferred embodiments described herein are only exemplary, and that the invention is capable of many modifications and variations in construction, arrangement and use without departing from the spirit of the invention.

Further modifications of the invention are also possible. For example, the flexible roll means and methods disclosed herein are also applicable to other reciprocated loads. Also, the present invention is applicable for providing the positioning required in other forms of recording and/or reproducing disk systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. Carriage means including a body on a prescribed pair of roll assemblies, each assembly adapted for rolling engagement on associated rail means, each rail means disposed along a respective side of the body and comprising a first and second guide face; each roll assembly comprising a pair of spaced roller
   sets disposed along a respective side of the body, each set comprising a frrst and second roller means, each first roller means being adapted and disposed to be engaged guidingly, and roll-ingly, with a respective first guide face means; each second roller means being adapted and disposed to be similarly engaged with a respective second guide face means;
   one such roll assembly being "flexible" with one of its roller sets having both roller means compliantly deflectable upon urging of its respective rail means thereagainst and also with the other of its roller sets having one roller means so compliantly deflectable, whereby to better assure "full-line contact" of all the roller means with respective guide faces.

2. The invention as recited in claim 1 where the body is part of an actuator body adapted to translate read/write transducer means across various tracks of one or several disk faces.

3. The invention as recited in claim 2 where the roller means each comprise a like cylindrical roller mounted for rotation on a shaft; and wherein the so-deflectable roller means have their roller shafts constructed to be bendable and mounted on the actuator body to be presented in oblique non-parallel relation with a respective guide face, but, when so urged thereby to be deflected and pivoted into substantial parallelism and full-line contact therewith.

4. The invention as recited in claim 3 where the shaft of each said deflectable roller means is sufficiently thin and bendable to be so pivoted under the pre-load bias of a respective guide face.

5. The invention as recited in claim 4 wherein there is a stack of such actuator bodies each aligned with a respective pair of "first" and "second" rails, each presenting a parr of divergent first and second flats, the array of first rails being incorporated into a first guide plate, the array of second rails being incorporated into a second guide plate, these plates being selectively co-joined in spaced relation biasing a respective actuator body therebetween and so forming guide-box means.

6. The invention as recited in claim 5 wherein the near ends of the actuator bodies are disposed and adapted to be driven toward and away from the disks.

7. The invention as recited in claim 6 wherein each actuator body is arranged to be so driven independently and selectively.

8. The invention as recited in claim 7 where each actuator body presents recording transducer means at one end, and the roller means comprise mini-bearings.

9. A transducer actuator assembly for a rotating disk memory apparatus comprising: at least one carriage; means for mounting at least one transducer at one end of the carriage; means adjacent the periphery of the rotating disks of the memory apparatus for guiding the carriage for movement along a desired linear path of travel relative to the disk; means for reciprocating each carriage to transfer the transducer to a desired track location on the rotating disk including drive coil means mounted on the carriage, at least one pair of permanent magnets stationarily mounted to the memory apparatus and adapted to drivingly register with said coil means, whereby when said coil means is energized, motive forces are applied; said Carriage means including a body on a prescribed pair of roll assemblies each assembly adapted for rolling engagement on associated rail means, each rail means disposed along a respective side of the body and comprising a first and second guide face;
   each roll assembly comprising a pair of spaced roller sets disposed along a respective side of the body, each set comprising a frrst and second roller means, each first roller means being adapted and disposed to be engaged guidingly, and roll-ingly, with a respective first guide face; each second roller means being adapted and disposed to be srmilarly engaged with a respective second guide face;
   one such roll assembly being "flexible" with one of its roller sets having both roller means compliantly deflectable upon urging of its respective rail means thereagainst and also with the other of its roller sets having one roller means so compliantly deflectable, whereby to better assure "full-line contact" of all the roller means with respectrve guide faces.

10. The actuator assembly according to claim 9, wherein the means for guiding the carriage includes a base member, a first straight rail rigidly mounted to the base member to determine said linear path of travel of the carrrage, a second moveable straight rail parallel to the first, and means for biasing the moveable rail toward the fixed rail to engage the carriage between the rails in resilient rolling contact therewith.

11. The actuator assembly according to claim 10, wherein said rails each comprise a pair of flats conversing toward their roller means, these rollers being cylindrical and mounted to the carriage in pairs for engagement on their flats, and including, means for mounting some of the rollers to be resiliently deflected upon engagement against the associated rail flats along lines of contact.

12. The actuator assembly according to claim 11, wherein two pairs of rollers are mounted on one side of the carriage and are "flexible", in that both rollers in one pair have a resiliently-deflectable shaft while one roller of the other pair is so deflectable; and wherein the rollers comprise "ball bearings".

13. In a magnetic disk memory storage apparatus including a base, spindle means mounted to the base for rotating at lease one disk, a transducer means for accessing information magnetically recorded in the disk, and an actuator assembly for moving the transducer means along a straight line to distal track locations on the disk, the improvement whereby said actuator assembly includes a carriage, a pair of roll means for guiding the carriage along a linear path adjacent periphery of the disk, and motive means;

this carriage including a body on a prescribed pair of roll assemblies, each assembly adapted for rolling engagement on an associated rail means, each rail means disposed along a respective side of the body and comprising a first and second guide face;

each roll assembly comprising a pair of spaced roller sets disposed along a respective side of the body, each set comprising a first and second roller means, each first roller means being adapted and disposed to be engaged guidingly, and roll-ingly, with a respective first guide face; each second roller means being adapted and disposed to be similarly engaged with a respective second guide face;

one such roll assembly being "flexible" with one of its roller sets having both roller means compliantly deflectable upon urging of its respective rail means thereagainst and also with the other of its roller sets having one roller means so compliantly deflectable, whereby to better assure "full-line contact" of all the roller means with respective guide faces.

14. In the memory storage apparatus according to claim 13, wherein said means for guiding the carriage includes a first guide rail rigidly mounted to the base; a second guide means for biasing the second rail against the carriage, with the roller means comprising a first and second array, one on one side of each actuator carriage; only one of these arrays being "flexible" and comprising a first and second set of bearing rollers, the rollers in one set both being "splayable" and only one roller in the other set being "splayable".

15. A method of providing a reciprocable actuator body which is better, more fully aligned on its guideways, the guideways comprising first and second track surfaces flanking one side of this body and third and fourth track surfaces flanking the other side of the body, this body including a first and second roll means, each arranged along a respective side of the body and each comprising an array of spaced rollers comprising first and second rollers for guided rolling engagement along the first and second track surfaces plus third and fourth rollers for guided rolling engagement along the third and fourth track surfaces, this method comprising:

making only one of the roll means and its roller arrays flexible for more tolerant engagement of respective track surfaces, whereby the first and second and third rollers are all constructed and disposed to be compliantly urged from oblique contact to full-line contact with their respective track surfaces when these surfaces are biased against them.

16. The method of claim 15 wherein said first, second and third rollers in one array each present a roller shaft that is sufficrently bendable to suffer said urging, to be pivoted into said full-line contact when so biased.

17. The method of claim 16 wherein each said shaft is normally skewed a few degrees out of said full line contact, while adapted to be so bent this few degrees when so biased.

18. The method of claim 17 wherein the rollers are "ball bearings".

19. Carriage means for a magnetic disk drive, this carriage means including a body on a prescribed pair of roll assemblies, this body being part of an actuator body adapted to translate read/write transducer means across various tracks of one or several disk faces, each assembly adapted for rolling engagement on associated rail means, each rail means disposed along a respective side of the body and including guide face means;

each roll assembly comprising a pair of spaced roller sets disposed along a respective side of the body, each set comprising a first and second bearing means, each bearing means being adapted and disposed to be engaged guidingly, and roll-ingly, with a respective guide face means;

one such roll assembly being "flexible" with one of its roller sets having both bearing means compliantly deflectable upon urging of its respective rail means thereagainst and also with the other of its roller sets having one bearing means so compliantly deflectable, whereby to better assure "full-line contact" of all the bearing means with respective guide face means;

each bearing means comprising a like cylindrical roller mounted for rotation on a shaft; and wherein the so-deflectable bearing means have their bearing shafts constructed to be bendable and mounted on the actuator body to be presented in oblique nonparallel relation with a respective guide face means, but, when so urged thereby to be deflected and pivoted into substantial parallelism and full-line contact therewith.

20. The invention as recited in claim 19 where the shaft of each said deflectable bearing means is sufficiently thin and bendable to be so pivoted under the pre-load bias of a respective guide face means.

21. The invention as recited in claim 19 wherein there is a stack of such actuator bodies each aligned with a respective pair of "first" and "second" rails, each presenting a pair of convergent first and second flats, the array of first rails being incorporated into a first guide plate, the array of second rails being incorporated into a second guide plate, these plates being selectively conjoined in spaced relation biasing a respective actuator body therebetween and so forming guide-box means; the near ends of the actuator bodies being disposed and adapted to be driven toward and away from the disks.

* * * * *

UNITED STATES PATENT AND TRADEMARK OFFICE
CERTIFICATE OF CORRECTION

PATENT NO. : 4,730,226
DATED : March 8, 1988
INVENTOR(S) : Arkady K. Shatkin

It is certified that error appears in the above-identified patent and that said Letters Patent is hereby corrected as shown below:

```
Col.  3, line 10, change "o" to --of--.
Col.  6, line 37, change "bearrngs" to --bearings--;
         line 67, change "mounte" to --mounted--.
Col.  7, line  3, change "elatively" to --relatively--.
Col.  8, line 40, change "assum" to --assume--.
Col.  9, line 47, change "frrst" to --first--.
Col. 10, line 13, change "parr" to --pair--;
         line 49, change "frrst" to --first--;
         line 53, change "srmilarly" to --similarly--;
         line 61, change "respectrve" to --respective--;
         line 66, change "carrrage," to --carriage,--.
Col. 12, line 12, change "sufficrently" to --sufficiently--.
```

Signed and Sealed this

Twelfth Day of July, 1988

*Attest:*

DONALD J. QUIGG

*Attesting Officer*    *Commissioner of Patents and Trademarks*